Patented June 26, 1923.

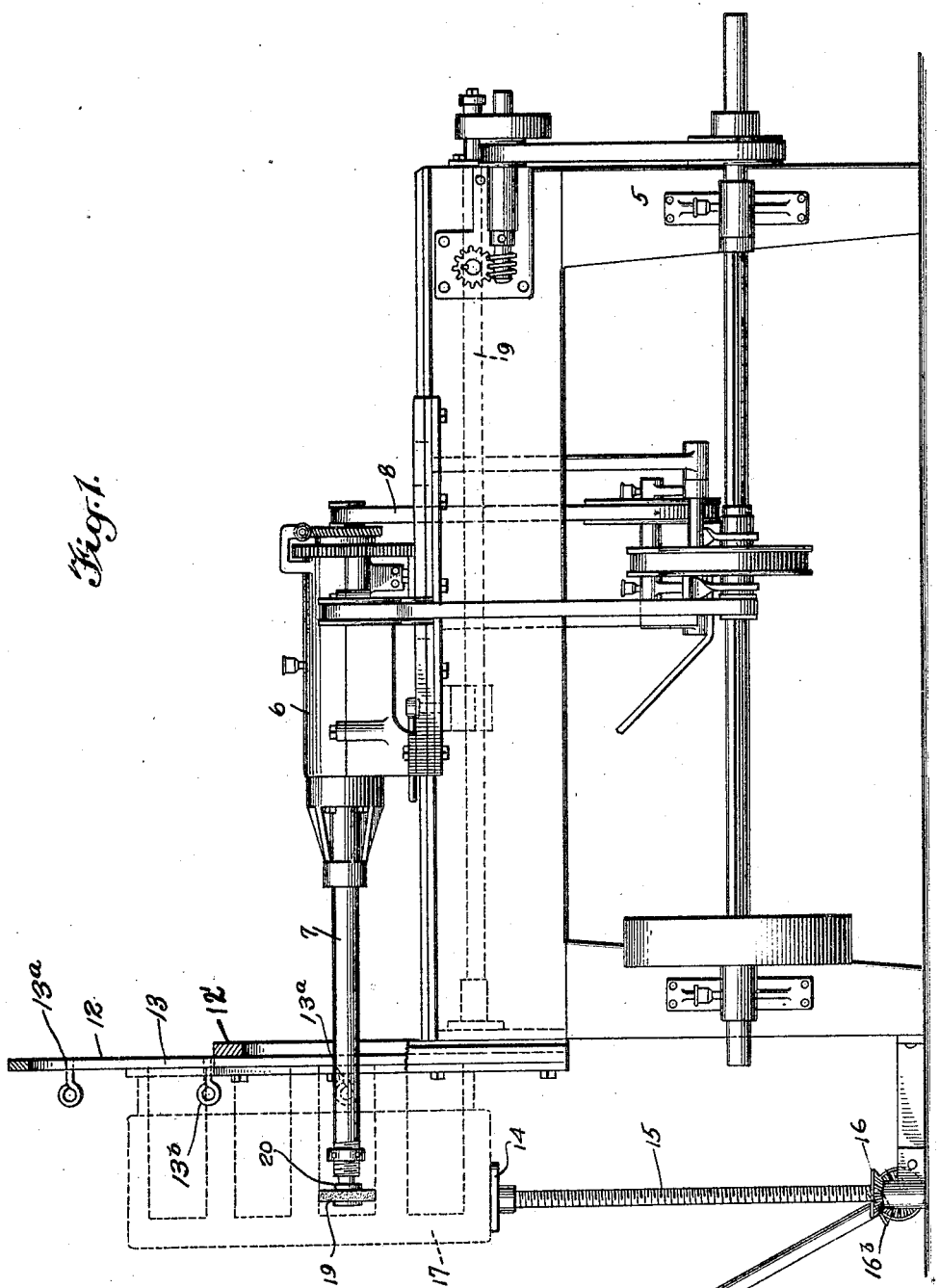

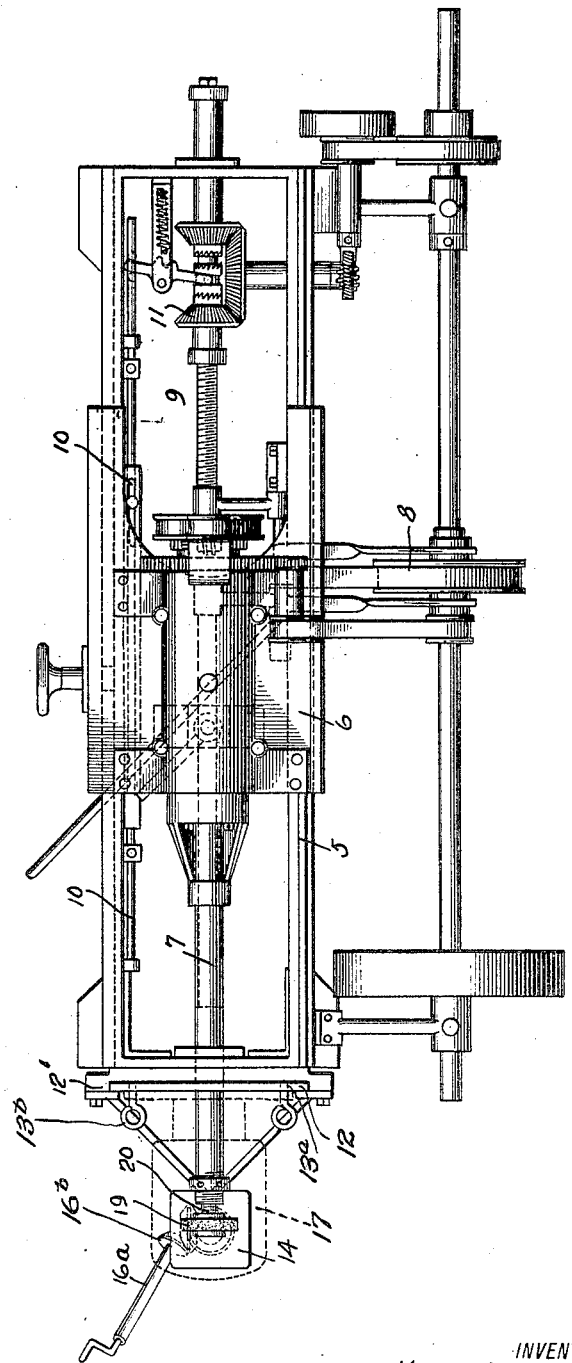

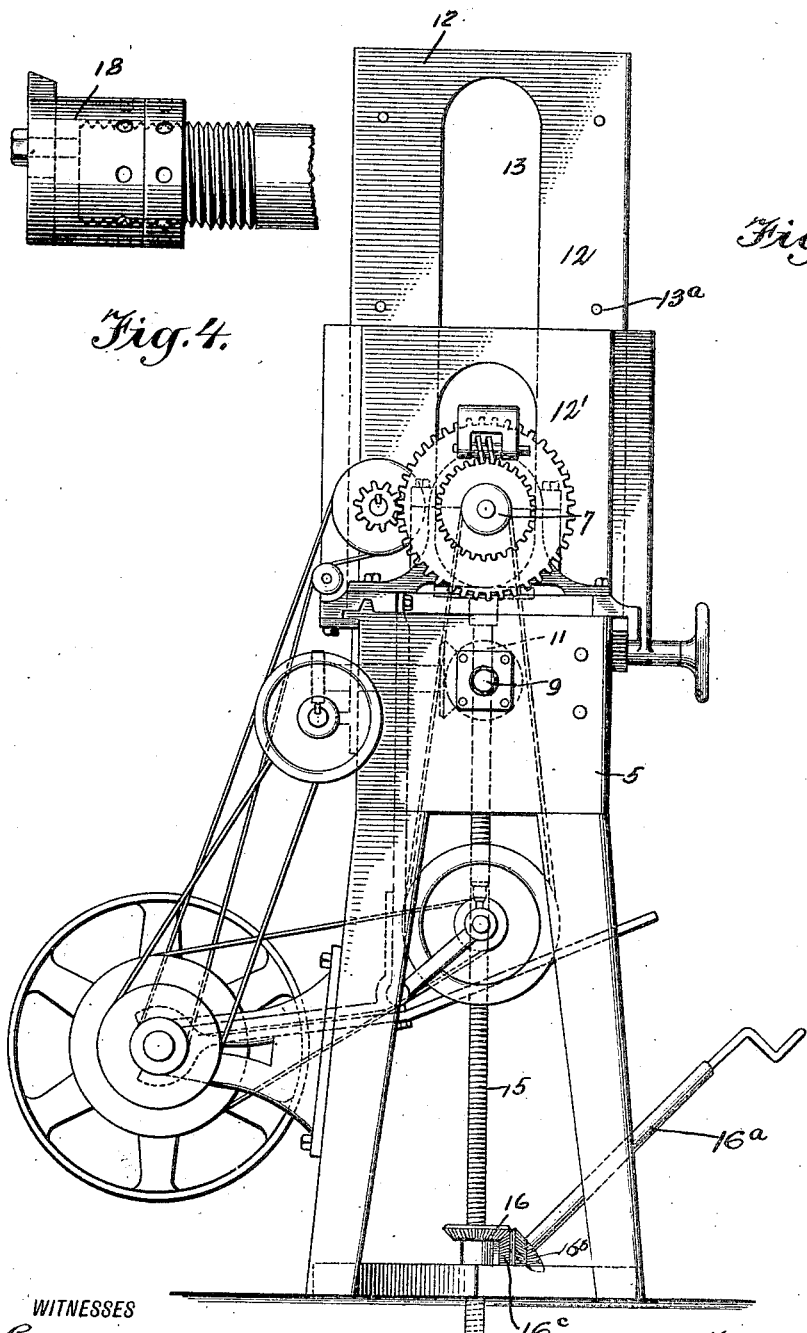

1,460,342

UNITED STATES PATENT OFFICE.

VICTOR BARTLEY AND JAMES B. WORTHINGTON, OF OKLAHOMA, OKLAHOMA.

GRINDING AND BORING MACHINE.

Application filed August 9, 1921. Serial No. 490,936.

*To all whom it may concern:*

Be it known that we, VICTOR BARTLEY and JAMES B. WORTHINGTON, citizens of the United States, and residents of Oklahoma city, in the county of Oklahoma and State of Oklahoma, have invented a new and Improved Grinding and Boring Machine, of which the following is a full, clear, and exact description.

Our invention relates to a grinding and boring machine and aims to provide a device of this character particularly adapted for use in connection with cylinder blocks.

It is a well understood fact that considerable difficulty has been experienced in grinding and finishing the interior of cylinders, and particularly where these cylinders have been mutilated and the work being undertaken is in the nature of repair work.

With this in mind our invention aims to provide a machine of the type stated, by means of which even badly mutilated cylinders may be readily reground and finished and in such a manner that the completed work will be as nearly perfect as it is possible to make the same.

A still further object of this invention is the provision of a machine adapted to be used in connection with treatment of articles of the nature specified, which shall be extremely simple in construction, and in which means will be provided serving to effectually support the work being handled, so that no undue strains will be transmitted to the machine as a whole, thus permitting of better work being produced.

Still further objects of this invention will appear in the annexed specification taken in connection with the drawings which latter present a practical embodiment of the same, and in which:

Figure 1 is a side elevation of a machine embodying our improved construction;

Figure 2 is a plan view thereof;

Figure 3 is an end view of the same; and

Figure 4 is a fragmentary enlarged view of the end of the spindle of the machine and showing the boring tool associated therewith.

Referring to the first three views, it will be noted that the reference numeral 5 indicates the frame of the machine, which serves to support a carriage 6, the latter mounting a spindle 7 which is operated through suitable transmission 8.

Any suitable means, such as a screw threaded shaft 9, may be utilized for effecting a feeding of the carriage and spindle carried thereby, and this movement on the part of these elements may be automatically regulated by means of suitable linkage 10 connected to an automatic reversing clutch 11, so that the machine may be set in operation, and after this occurs, the carriage and spindle will be automatically projected to a predetermined point and subsequently retracted to a second predetermined point, this operation being continued until the source of power is disconnected from the parts specified.

A fixed vertical guiding member 12' for a vertically adjustable chucking plate 12 is provided adjacent one end of the machine. The chucking plate 12 has a vertically elongated opening 13 arranged to have a portion thereof always in registry with a similar but shorter opening in the guiding member, all as shown best in Figure 3; through which openings the spindle 7 is passed lengthwise back and forth during working of the machine.

All as shown most clearly in Figures 1 and 2, an auxiliary chucking member, a horizontal table 14, is also provided just beyond the chucking plate 12. This table rests squarely and flatly on the upper end of a vertical shaft 15 having a portion threaded through a bevel gear 16 so that such gear may be turned to raise or lower the shaft 15. This gear is turned by manually operating a handle 16$^a$, as desired, this handle being held for turning about a fixed axis, by any suitable support (not shown). The handle carries fixedly at its lower end a bevel pinion marked 16$^b$ in Figure 2 and this pinion rotates gear 16 through an interposed pair of bevel gears marked 16$^c$ in Figure 3 and mounted on a suitable stud shaft (not shown).

It will be understood that when a cylinder block, such as that shown at 17 in Figures 1 and 2 is disposed on the table 14 and secured to the chucking plate 12, the arrangement of the parts is such that the handle 16$^a$ may be turned to raise or lower the cylinder block to dispose different cylinders in operative relation to the particular tool carried by the adjacent end of spindle 7; whereby the guiding action of member 12' relative to the chucking plate keeps the cylinders always parallel to the axis of the spindle, and yet the entire weight of the heavy cylinder block is actually supported by the table 14, thereby relieving the more delicate parts of the machine of all strains.

The means utilized to secure various cylinder blocks to chucking plate 12 include, on the one hand, a pair of the usual bolt holes in the face of the cylinder block provided for the purpose of mounting the cylinder head on the block when the engine is assembled, and, on the other hand, a pair of similarly spaced holes on the chucking plate 12. Three pairs of the holes last mentioned are indicated at 13$^a$ in Figs. 1, 2 and 3. When a pair of bolt holes on the block are registered with a pair of holes on the plate, the block is conveniently secured to the plate by utilizing removable eye-pins 13$^b$ as illustrated in Figs. 1 and 2.

As shown in Figures 1 and 2 the block 17 is rested on the stool 14 and attached to the sliding plate 12′ thereby all strains which the weight of this block might cause to this machine is relieved. In this manner the block 17 is presented to the grinding tool in a plane exactly parallel to the latter.

Now, assuming that it is necessary to regrind, as well as refinish the cylinders within the block 17, it will be noted, reference being had to Figure 4, that a suitable boring or grinding tool 18 may be affixed directly to the spindle 7 and the latter may be caused to rotate to accurately bore the cylinder to the dimension desired. By coupling the boring tool 18 with the spindle 7 a relatively great rigidity is secured, and thus, it will be found that this operation will be satisfactory in all particulars. To produce the interior finish desired, however, a suitable grinding wheel 19 is utilized and in this connection it will be noted that the spindle 7 constitutes virtually a housing so that the grinding wheel 19 may be mounted upon a secondary spindle 20 within the housing, for the purpose of properly supporting the grinding wheel to permit the same to refinish the cylinder surface.

Thus it will be seen that an object to be worked upon, such as a cylinder block, may be placed upon the stool 14 and the latter may readily be manipulated so that the cylinders will properly align with the tool associated with the spindle. Once the cylinder block is adjusted on the machine the same is started, and thereby the spindle 7 is rotated causing this tool to enter the cylinder in line with it and retract itself upon its reaching the end of the cylinder. The operation is automatic and continues until the operator is satisfied that the inner surface of the cylinder has been thoroughly ground.

Further, by virtue of the construction of the chucking means including the table 14 in combination with the plate 12, in order that it may at all times be assured that the work will be disposed in its proper position with respect to the tools, which will operate upon the same, it will be appreciated that no strain will be thrown upon the machine as a whole.

It will be noted that the new chucking means involving the combination of guiding member 12′, chucking plate 12 and table 14, and arranged in line with, but not between, the two end legs of the frame which supports the weight of the spindle and spindle operating parts, always holds true and precisely true, a very heavy block of the multi-cylinder type, but at no time does any appreciable part of the weight of the heavy block receive support from the frame or the guiding member or the chucking plate, and thus there is no tendency to strain the guiding member or chucking plate transverse to their planes, and no tendency to rock the chucking plate out of its appointed plane of sliding perpendicular to the axis of rotation of spindle 7.

By virtue of the foregoing, it will be appreciated that all the objects set forth in the preamble of the specification are accomplished and it will be further understood that numerous modifications of the structure might readily be resorted to without in the least departing from the scope of our claims, which are:

1. In a grinding machine of the class described, a frame, a spindle carried by said frame and adapted to carry a tool, means for rotating said spindle, a chucking plate vertically movable adjacent one end of the frame, and a vertically movable table adjacent said end of the frame for carrying the main weight of the work when such work is fixedly attached to the chucking plate to project from the latter substantially horizontally, said table being the sole means of support for engaging a part of the work so projected whereby on lifting the table the work is lifted therewith and in turn the work lifts the chucking plate while the chucking plate guides the work.

2. A machine defined in claim 1, wherein means are provided for endwisely advancing said spindle back and forth during rotation thereof, and wherein said chucking plate is slidable and the paths of movement of said plate and table are in parallel planes with the plane of the plate always substantially at right angles to the plane of the table.

3. A machine defined in claim 1, wherein means are provided for endwisely advancing said spindle back and forth during rotation thereof, and wherein said chucking plate is slidable and the paths of movement of said plate and table are in parallel planes with the plane of the plate always substantially at right angles to the plane of the table, said chucking plate having a vertically elongated opening opposite the line of endwise advance of the spindle.

4. A machine defined in claim 1, wherein means are provided for endwisely advancing said spindle back and forth during rotation thereof, and wherein said chucking plate is slidable and the paths of movement of said plate and table are in parallel planes with the plane of the plate always substantially at right angles to the plane of the table, said chucking plate having a vertically elongated opening opposite the line of endwise advance of the spindle, there being provided means for supporting said table for movement independently of said chucking plate, said supporting means being located beyond said frame.

VICTOR BARTLEY.
JAMES B. WORTHINGTON.